United States Patent [19]

Weber

[11] Patent Number: 4,746,782
[45] Date of Patent: * May 24, 1988

[54] METHOD FOR SECURING CUT PIECES IN SPARK EROSIVE CUTTING

[75] Inventor: Benno Weber, Porto Ronco, Switzerland

[73] Assignee: AG fur industrielle Elektronik AGIE, Losone b. Locarno, Losone, Switzerland

[*] Notice: The portion of the term of this patent subsequent to Feb. 18, 2003 has been disclaimed.

[21] Appl. No.: 829,839

[22] Filed: Feb. 14, 1986

Related U.S. Application Data

[63] Continuation of Ser. No. 617,628, Jun. 6, 1984, Pat. No. 4,571,477.

[30] Foreign Application Priority Data

Jun. 9, 1983 [CH] Switzerland ............ 3173/83

[51] Int. Cl.$^4$ .................... B23H 7/06
[52] U.S. Cl. .............. 219/69 M; 204/129.1; 219/69 W
[58] Field of Search .......... 219/68, 69 R, 69 M, 219/69 W, 69 V; 204/129.1, 129.2, 129.5, 129.6, 129.7

[56] References Cited

U.S. PATENT DOCUMENTS

| | | | |
|---|---|---|---|
| 3,474,219 | 10/1969 | Steigerwald et al. | 219/69 W |
| 3,849,624 | 11/1974 | Dulebohn et al. | 219/69 W |
| 4,467,166 | 8/1984 | Gano et al. | 219/69 M |
| 4,484,052 | 11/1984 | Inoue | 219/69 M |
| 4,486,642 | 12/1984 | Inoue | 219/69 W |
| 4,598,190 | 7/1986 | Balleys | 219/69 W |

FOREIGN PATENT DOCUMENTS

| | | | |
|---|---|---|---|
| 2303842 | 8/1974 | Fed. Rep. of Germany | 219/69 W |
| 2351357 | 6/1975 | Fed. Rep. of Germany | |
| 51-116674 | 10/1976 | Japan | |
| 55-137835 | 10/1980 | Japan | 219/69 W |
| 56-27736 | 3/1981 | Japan | 219/69 M |
| 56-82128 | 7/1981 | Japan | 219/69 W |
| 114621 | 9/1981 | Japan | 219/69 M |
| 56-126526 | 10/1981 | Japan | |
| 57-127626 | 8/1982 | Japan | 219/69 W |
| 57-144629 | 9/1982 | Japan | 204/129.2 |
| 58-28429 | 2/1983 | Japan | |

Primary Examiner—A. D. Pellinen
Assistant Examiner—Geoffrey S. Evans
Attorney, Agent, or Firm—Neuman, Williams, Anderson & Olson

[57] ABSTRACT

In the spark erosive cutting of preprogrammed closed contours with the aid of a wire electrode, the electrode is angled in such a way at the end of a closed cutting curve, that a web is left between the workpiece and the fall-off piece. The web only takes up part of the height of cut or the workpiece height. As a result, fault-free surfaces can be obtained along the portion of the cutting curve that is completely cut around the closed contour, at least for a portion of the workpiece height, so that workpieces cut in accordance with this method can be used directly and without reworking.

3 Claims, 2 Drawing Sheets

U.S. Patent    May 24, 1988    Sheet 1 of 2    4,746,782

# METHOD FOR SECURING CUT PIECES IN SPARK EROSIVE CUTTING

This application is a continuation of application Ser. No. 617,628, filed on June 6, 1984 and issued as U.S. Pat. No. 4,571,477.

BACKGROUND OF THE INVENTION

In spark erosive cutting, workpieces are worked by means of a tool electrode cutting wire under the control of a digital tool control system on the basis of predetermined cutting path information. The cutting wire and workpiece are connected to a generator which, under the influence of a control circuit, supplies clearly defined current or voltage pulses for maintaining the spark erosive process between the cutting wire and the workpiece. The shapes to be cut in the workpiece frequently form a closed path curve, so that the cutting wire returns to its initial position towards the end of the cutting process, forming a fall-off piece which threatens to become detached from the fixed workpiece. In accordance with the user's requirements, either the cut out inner part or the surrounding outer shape is intended for further use. There is now a danger towards the end of the cutting process of an unsecured fall-off piece destroying the wire electrode or sticking to parts of the working device on becoming detached from the remaining fixed workpiece. It is not desirable to also fix the fall-off piece when cutting closed curves, because in this case free access to the cutting path by the wire guidance heads would not be ensured over the entire cutting path, so that resetting of the workpiece would be necessary. In view of the use of the device in mass production operations and the desire for maximum automation of operations, this would be undesirable.

Measures are already known for securing a fall-off piece. For example, a thin residual web between the workpiece and the fall-off piece may be left after cutting to secure the fall-off piece, the latter being eventually detached from the remaining workpiece by an external force application, such as a hammer blow at the end of the cutting process. The disadvantage of this process is that a manual operation is necessary, which should be avoided with the aim of achieving automatic machining methods. Another disadvantage of the known process is that the web must be carefully dimensioned with respect to the material to be cut, so that the fall-off piece can in fact be knocked off. Another disadvantage is that the breaking point generally does not permit any subsequent machining, so that the clean working of closed cutting curves is not satisfactorily ensured.

In view of these difficulties, it has already been proposed (JP-OS No. 56-126,526/1981) as an alternative to the conventional practice to arrange the cutting wire in a horizontal manner and to fix the workpiece in such a way that, due to the desired cutting curve, a cut off inner part sinks vertically downwards and is supported on the already cut surface of the workpiece. Such a process can only be used if there are relatively wide areas of cut, i.e. large workpiece thicknesses are available, and if the cutting track is not too wide compared with the width of the cut contour. Therefore, general use of this process is not possible.

A further proposal (JP-As 51-116,674/1976) is directed at an adhesive-bonded joint between the fall-off piece and the remainder of the workpiece. A mechanical and electrical connection between the two parts is produced with the aid of an adhesive or with the aid of holders or clips. However, this process cannot be used in a fully automated working operation. According to another proposal (DE-OS No. 2,351,357), metals with a low melting point are heated and dripped into the already cut path, or the latter is bridged with the aid of anaerobic adhesives. The disadvantage of this proposal is that the corresponding dosing or metering means must be aligned very accurately with the already cut and usually very narrow track, in order to ensure the penetration of the bonding medium. The joint which is formed between the fall-off piece and the workpiece obstructs a trimming or shaving operation, in which the cutting mechanism is used automatically, without resetting the workpiece, for improving the surface quality of the cut workpiece or for the fine trimming of the corners. It is also a disadvantage that at the end of the cutting process, bonding medium residues are left behind on the worked surfaces and have to be laboriously removed therefrom.

The use of controllable, movable mechanical holding means for receiving the fall-off piece has also proved unsatisfactory, because such means often exert a disturbing force on the wire electrode, which generally leads to cutting imperfections on the workpiece and, due to the additional mechanical work, causes difficulties when installing the machine and during the actual cutting process.

SUMMARY OF THE INVENTION

The problem addressed by the present invention is to provide a method of securing a fall-off piece without additional aids, which is suitable for use on digitally controlled machine tools and which permits a subsequent easy separation of the fall-off piece from the machine tool, without any reworking of the workpiece being necessary. According to the present invention, the preprogrammed cutting path defining the fall-off piece is not cut entirely through, but is terminated short of completion to leave a residual web section connecting the fall-off piece to the remaining, secured workpiece. Unlike the conventional method of utilizing a residual web section that extends across the entire height of the workpiece, in the method of the present invention the residual web is formed by completing the preprogrammed cutting path at a modified cutting angle setting of the tool electrode relative to the initial cutting angle setting. By this method of spark erosive cutting, a residual web having a generally triangular cross-section remains following cutting to support the fall-off piece. Since the remaining residual web only extends over part and not the entire height of the workpiece, the fall-off piece can be relatively easily separated from the remainder. The method of the invention can be used with particular advantage when cutting closed contours, such as are required for male and female moulds, because a continuously worked area of cut is obtained which is not disturbed by web residues, adhesives or the like and which requires no reworking. With respect to such workpieces, the residual web causes no problems in general during subsequent use, because that part of the workpiece is used for fixing purposes.

BRIEF DESCRIPTION OF THE DRAWINGS

The invention is described in greater detail hereinafter by example with reference to the drawings, in which.

DETAILED DESCRIPTION OF THE PREFERRED EMBODIMENTS

Figure 1:
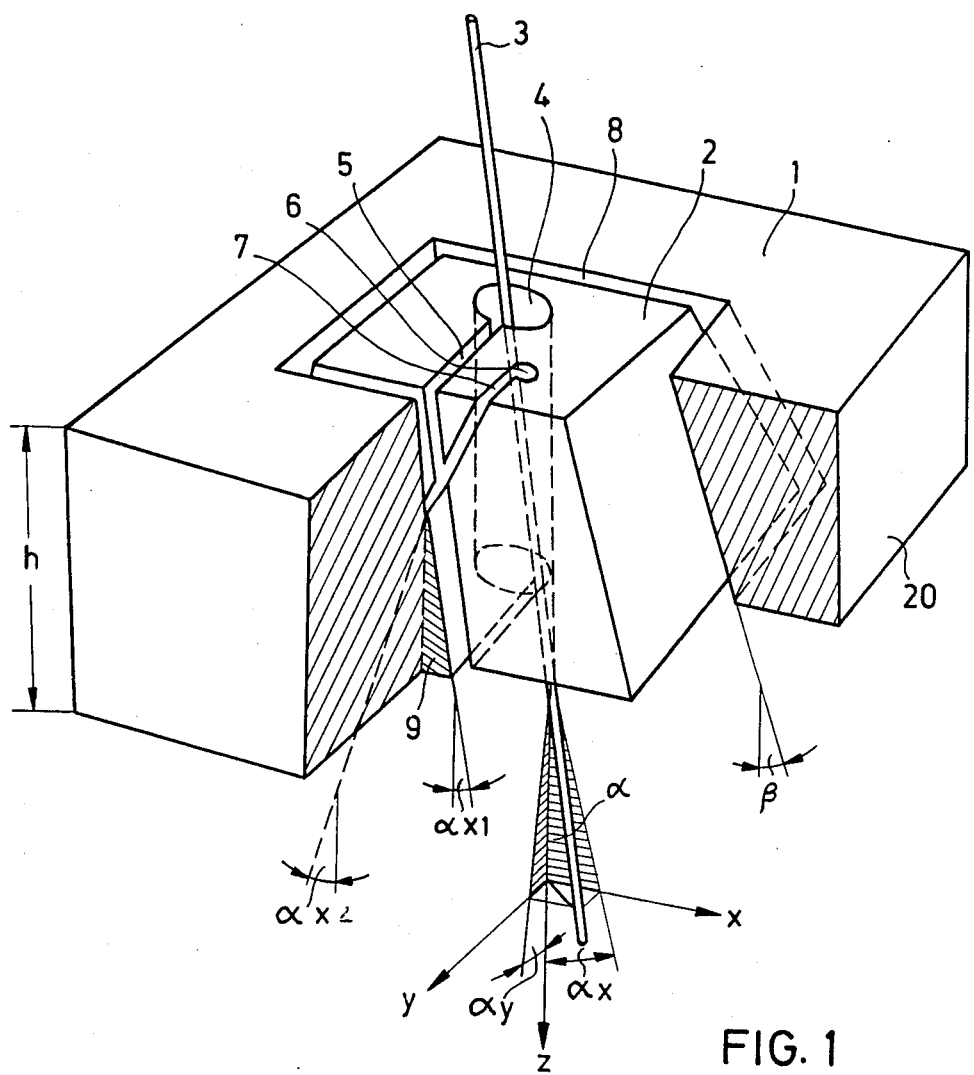
FIG. 1 shows the basic diagram of a workpiece to be cut in accordance with the present invention.

FIG. 1 shows as an embodiment, a parallelepipedic workpiece 1 which, for ease of viewing, is shown with a broken-away front corner. A fall-off piece 2 arranged within the workpiece 1 is almost completely cut out by spark erosive cutting using a tool electrode 3, for example a cutting wire. The fall-off piece 2 is connected to the remainder of the workpiece by a web 9, which only takes up part of the height of cut h, which is in the present case identical with the workpiece height. The cutting curve 8 produced by tool electrode 3 can be produced by a "cylindrical" cut, where the tool electrode 3 cuts parallel to the side faces 20 of parallelepipedic workpiece 1, or the cut can take place "conically" as shown in FIG. 1, where the tool electrode is at an angle $\beta$ with respect to the vertical.

The working of the workpiece starts in a starting bore 4, which has previously been made in the workpiece. If the starting bore has been made sufficiently large, the tool electrode 3 can be adjusted within the bore to a solid bevel angle $\alpha$ relative to the vertical, which is in the cartesian coordinate system X, Y, Z of the machine, as shown in FIG. 1. Angle $\alpha$ is formed from the vector sum of the inclination angle $\alpha_X$ in the X-Z plane and the inclination angle $\alpha_Y$ in the Y-Z plane, these angular positions being shown in the lower part of FIG. 1. The values are fed into a computer connected to the machine as part of the digital tool control system.

The electrode 3 is then moved along a starting section or line 5 into an entry zone of the cutting curve 8 to be cut. The electrode enters under angle $\alpha_{X1}$ with respect to the X-Z plane. Alternatively, the electrode 3 can be mounted along the starting line without any sloping position and during the passage through the latter can be brought into the desired initial sloping position.

Following the entry of electrode 3 into cutting curve 8, the latter is traversed and cut in known manner, e.g. counterclockwise. The exemplified cone angle $\beta$ for the slope of the cutting profile relative to the tool geometry can be kept at a constant value during cutting, or it can be continuously or discontinuously varied during the cutting process. As far as possible, in the represented embodiment, the first piece of cutting curve 8 after starting line 5 is to have a flat surface. Thus, after passing through cutting curve 8, the slope of electrode 3 can be changed to a different inclination angle $\alpha_{X2}$ before reaching the initial zone. Following this change, the electrode 3 leaving the cutting curve 8 changes into a withdrawal section or line 7 and finally into a withdrawal bore 6. As a result of this measure, even after the cutting process is ended, fall-off piece 2 remains connected to workpiece 1 by means of web 9.

The withdrawal bore 6 can be directly spark erosively cut by means of electrode 3. Bore 6 is only necessary if working is not at an end on reaching the withdrawal line 7. In this case, it is possible to set within bore 6 a new machine setting, as well as a new cone angle $\beta$ relatively to workpiece 1, so that subsequently the cutting curve 8 can be traversed in the opposite direction, for example, to perform a smooth finishing cut on the worked workpiece surface. Such smooth finishing or modification cuts can also be performed in a plurality of alternating reciprocating movements around the cutting curve 8. If a particularly rigid fixing of the fall-off piece to the workpiece is required for such repetition cuts, the web can be left correspondingly large up to the final cut. Only during the final working stroke is the surface of the web reduced to such an extent that it is no longer able to withstand the previously calculated breakoff forces, which are required for detaching the fall-off piece 2 at the end of the entire working process and after removal from the machine.

Figure 2:
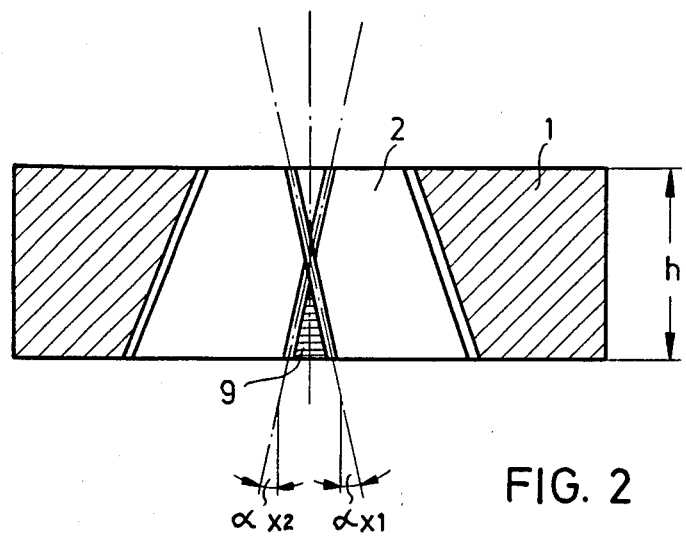
FIG. 2 is the sectional representation through the residual web according to FIG. 1.

The sectional representation of FIG. 2 which corresponds to the front part of cutting curve 8 in FIG. 1, shows workpiece 1 with the fall-off piece 2 largely detached therefrom, only web 9 serving as a link between the two parts. In the present embodiment, web 9 has a triangular cross-section. In the Z-Y plane, the legs of web 9 are defined by the entrance angle $\alpha_{X1}$ and the emergence angle $\alpha_{X2}$. FIG. 2 shows that the upper part of the workpiece height h is cut through continuously and smoothly in accordance with cutting curve 8, so that a continuous, uninterrupted cutting contour is formed in this upper part from start to finish.

Figure 3:
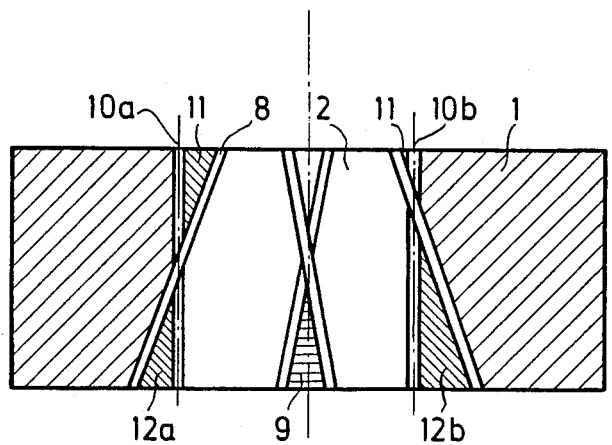
FIG. 3 is another illustrative embodiment showing the use of the method according to the invention in the case of combined cylindrical and conical cutting.

FIG. 3 shows the use of the method according to the invention when cutting a workpiece, in which combined conical and cylindrical surfaces are cut. The lefthand part of FIG. 3 shows cutting curve 8, as will be formed according to the description relative to FIG. 1. If it is now wished to pass to a second cutting curve 10, tool electrode 3 is set to another angle, which in the represented embodiment is shown as a cylindrical cut. As shown in FIG. 3, as a result of such a cut, conical core pieces 11 and 12a are formed all round between fall-off piece 2 and workpiece 1 and become detached from the latter. According to the invention, such machining problems may be solved by either of the two following methods.

According to a first method, the position of electrode 3 is modified from the conditions according to curve 8 to those according to curve 10 in incremental steps by repeated cycles, in such a way that the conical pieces 11 and 12a shown in hatched form in FIG. 3 are completely eroded by the spark erosive process and consequently working is not impaired by fall-off pieces. The repeated modification of the cutting angle of the electrode 3 is done in consideration of the width of the cutting track, determined by the selected wire thickness and the gap width for the electrical discharges.

According to a second method, which is represented in the right-hand half of FIG. 3, the position of the vertical cutting track 10b is selected in such a way that an upper conical part just disappears and consequently there is an increase in the surface area of the lower conical part 12b. This leads to a limited, but completely usable flange height, such as is required in the production of stamping or punching tools and which has a continuous clean cut in accordance with the given contour. However, the lower conical part 12b by the same method of the variable control of the entrance angle $\alpha_{X1}$ into the cutting curve 8 and the control of the emergence angle $\alpha_{X2}$ from cutting curve 8 can be so controlled that a preferred acute-angled web connection according to FIG. 1 with the workpiece 1 remains and which only takes up part of the workpiece height h. For this purpose, a slope $\alpha_X$ according to FIG. 1 must be chosen for the withdrawal process from cutting curve 8, slope $\alpha_X$ being larger than $\alpha_{X1}$ or $\alpha_{X2}$ during the first conical working.

The method according to the invention can be used both for producing male and female mould parts. Thus, the choice of the optimum securing system for each individual operation can take place on the basis of purely economic considerations. However, it is of vital economic importance that the method according to the invention makes it possible to construct spark erosive cutting equipment in a less complicated and costly manner than was hitherto the case, because there is no need for special means for securing the fall-off piece as a result of correspondingly selected cutting parameters for maintaining the connecting web.

What is claimed is:

1. In the spark erosive cutting of a conductive workpiece by a tool electrode under the control of a digital tool control system, the method of securing to the workpiece a workpiece part which is to be cut from the workpiece along a preprogrammed cutting path where the workpiece part is secured to the workpiece by a web of workpiece material extending between the workpiece and the workpiece part in which the preprogrammed cutting path comprises first and second intersecting cutting paths of different cutting angles, characterized in that in a first traverse of the preprogrammed cutting path along the first cutting path a first erosion treatment is performed by the tool electrode leaving a portion of the cutting path uncut to initially form the web; subsequently the tool electrode performs at least one additional erosion treatment along the preprogrammed cutting path in which the cutting position of the tool electrode between said first and second cutting paths is modified incrementally in consideration of the width of the tool electrode and the cutting gap between the tool electrode and the workpiece so that the workpiece volume between said first and second cutting paths is completely eroded; and before completing a final erosion treatment along the preprogrammed cutting path the tool electrode is passed through a modified cutting angle setting to maintain a residual web section of workpiece material between the workpiece and the workpiece part, said residual web section extending over part of the height of cut in the workpiece along only one of the first and second cutting paths and being configured so that it may be broken and the workpiece part detached from the workpiece upon application of a predetermined breakoff force.

2. In the spark erosive cutting of a conductive workpiece by a tool electrode under the control of a digital tool control system, the method of securing to the workpiece a workpiece part which is to be cut from the workpiece along a preprogrammed cutting path where the workpiece part is secured to the workpiece by a web of workpiece material extending between the workpiece and the workpiece part in which the preprogrammed cutting path comprises first and second intersecting cutting paths of different cutting angles, characterized in that in a first traverse of the preprogrammed cutting path along the first cutting path a first erosion treatment is performed by the tool electrode leaving a portion of the cutting path uncut to initially form the web; subsequently the tool electrode performs at least one additional erosion treatment along the preprogrammed cutting path; and before completing a final erosion treatment along the preprogrammed cutting path the tool electrode is passed through a modified cutting angle setting to maintain a residual web section of workpiece material between the workpiece and the workpiece part, said residual web section extending over part of the height of cut in the workpiece along only one of the first and second cutting paths and being configured so that it may be broken and the workpiece part detached from the workpiece upon application of a predetermined breakoff force; said first and second cutting paths being programmed so that there is no workpiece volume to be eroded between the cutting paths on a first side of the intersection of the cutting paths, and said residual web section is formed along the preprogrammed cutting path on the side of the intersection of the cutting paths opposite said first side.

3. In the spark erosive cutting of a conductive workpiece by a tool electrode under the control of a digital tool control system, the method of securing to the workpiece a workpiece part which is to be cut from the workpiece along a preprogrammed cutting path where the workpiece part is secured to the workpiece by a web of workpiece material extending between the workpiece and the workpiece part in which the preprogrammed cutting path comprises first and second intersecting cutting paths of different cutting angles, characterized in that in a first traverse of the preprogrammed cutting path along the first cutting path a first erosion treatment is performed by the tool electrode leaving a portion of the cutting path uncut to initially form a web extending over the height of the workpiece; subsequently the tool electrode performs at least one additional erosion treatment along the preprogrammed cutting path; and before completing a final erosion treatment along the preprogrammed cutting path the tool electrode is passed through a modified cutting angle setting to maintain a residual web section of workpiece material between the workpiece and the workpiece part, said residual web section extending only over part of the height of cut in the workpiece and being configured so that it may be broken and the workpiece part detached from the workpiece upon application of a predetermined breakoff force.

* * * * *